US012724546B2

(12) United States Patent
Urkude et al.

(10) Patent No.: US 12,724,546 B2
(45) Date of Patent: Sep. 1, 2026

(54) DYNAMIC STORAGE AGGREGATE LAYOUT REFRESH

(71) Applicant: NetApp, Inc., San Jose, CA (US)

(72) Inventors: Suhas Girish Urkude, San Ramon, CA (US); Byung Guk Kim, Morgan Hill, CA (US); Sowkoor Sunad Bhandary, Morrisville, CA (US); Ratnesh Gupta, Dublin, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/926,641

(22) Filed: Oct. 25, 2024

(65) Prior Publication Data

US 2026/0050382 A1 Feb. 19, 2026

Related U.S. Application Data

(60) Provisional application No. 63/684,086, filed on Aug. 16, 2024.

(51) Int. Cl.
*G06F 3/06* (2006.01)

(52) U.S. Cl.
CPC .......... *G06F 3/0619* (2013.01); *G06F 3/0659* (2013.01); *G06F 3/0689* (2013.01)

(58) Field of Classification Search
CPC .... G06F 3/0619; G06F 3/0659; G06F 3/0689; G06F 3/067; G06F 3/0637; G06F 3/0622; G06F 3/0605; G06F 3/0634; G06F 3/0683; G06F 16/137; G06F 16/1774; G06F 16/110709; G06F 16/0727; G06F 16/142; G06F 16/1425; G06F 16/2089
See application file for complete search history.

(56) References Cited

U.S. PATENT DOCUMENTS 8,005,792 B2 * 8/2011 Green ................. G06F 16/2329 707/638
8,543,757 B2 * 9/2013 Gorobets ............ G06F 12/0246 711/165
2008/0244172 A1 10/2008 Kano
2017/0249327 A1 * 8/2017 Gowdappa ............ G06F 16/166
2022/0100398 A1 * 3/2022 Raff ...................... G06F 3/0634

* cited by examiner

*Primary Examiner* — Hiep T Nguyen

(57) ABSTRACT

The disclosure describes systems, devices, and methods for managing data storage environments. In an example implementation, a method of operating a controller in a data storage environment is provided. In performing the method, the controller identifies a change to a layout of drives in the data storage environment, and in response to identifying the change, takes a lock on instances of layout metadata stored on the drives. The controller then updates the instances of the layout metadata to reflect the change to the layout and releases the lock.

20 Claims, 8 Drawing Sheets

700

DYNAMIC STORAGE AGGREGATE LAYOUT REFRESH

RELATED APPLICATIONS

This application hereby claims the benefit and priority to U.S. Provisional Application No. 63/684,086, titled “DYNAMIC AGGREGATE LAYOUT REFRESH FOR DISTRIBUTED SHARED-EVERYTHING ARCHITECTURE,” filed Aug. 16, 2024, which is hereby incorporated by reference in its entirety.

TECHNICAL FIELD

Embodiments of the present disclosure relate generally to data storage technology, and in particular, to managing layout metadata in a data storage environment.

BACKGROUND

A typical architecture of a data storage environment includes a host device, a controller, and storage devices capable of storing data. The host device interfaces with users to receive input/output requests for accessing the storage devices, and the host device communicates the input/output requests to the controller. The controller then interfaces with the storage devices to access locations in the storage devices specified in the input/output requests. The input/output requests refer to read operations, in which the controller reads data from the storage devices, and write operations, in which the controller writes data to the storage devices.

A one-to-one architecture in data storage contexts refers to an arrangement in which each controller in a data storage environment accesses a specific subset of storage devices in the data storage environment but does not interface with nor control other subsets of storage devices. Problematically, adding or replacing controllers to increase compute power in the environment requires adding or replacing associated storage devices given the nature of the architecture. Not only does this increase the cost of upgrading or replacing existing hardware, but also this increases the time and processing capacity required to replace equipment. Furthermore, the maximum compute power and efficiency of the overall system is limited based on the capabilities and bandwidth of a controller as input/output operations are not parallelized among multiple controllers.

Other problems also exist with such architectures. For example, when a controller or associated storage device fails, the entire portion of the data storage environment may be unavailable until recovery operations are performed. To improve redundancy and recovery in one-to-one data storage architectures, each subset of storage devices can be made up of several inexpensive data disks and a parity disk that provide redundancy with respect to each other. However, these redundancy groups rely upon a single controller scheme and shared metadata, which means the storage devices of a given group still fail together when issues occur.

SUMMARY

The technology described herein utilizes a shared-everything architecture for a data storage environment including multiple controllers and storage devices organized into redundancy groups (e.g., Redundant Array of Inexpensive Disks (RAID) groups). In this architecture, any controller can access any storage device (e.g., perform input/output (I/O) operations), and further, any controller can update the configuration layout of the storage devices, including the groups of storage devices and corresponding sequences of storage devices in the groups. While generally applicable to numerous endeavors, such advantages may be especially useful in data storage environments and I/O processing applications.

In an implementation, a method for operating a controller in a data storage environment to provide dynamic updates to configuration layout metadata is provided. The controller performs such a method when a storage device is removed (e.g., fails) and/or added to a storage aggregate of the data storage environment. When a failure of a storage device occurs, I/O operations may be improperly routed to failed storage devices causing a drop in the I/O. When a storage device is newly added, I/O operations might not be provided to the storage device as controllers might not be aware of its addition to the storage aggregate.

Upon the failure and/or addition of a storage device, the method includes taking a lock on instances of layout metadata stored on all of the storage devices such that the layout metadata becomes unavailable for editing by other controllers in the data storage environment. After locking metadata, the controller updates the layout metadata to reflect the change of the layout of the storage devices. Then, the layout metadata can be updated again (i.e., unlocked) to release the lock. Once other controllers identify the changes to the layout, I/O operations associated with the failed storage device can continue to be performed using one or more of the storage devices in the updated layout.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter. These and other features and aspects of various examples may be understood in view of the following detailed discussion and accompanying drawings.

BRIEF DESCRIPTION OF THE DRAWINGS

For a more complete understanding of the present invention(s), and the advantages thereof, reference is now made to the following descriptions taken in conjunction with the accompanying drawings.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION

Figure 1:
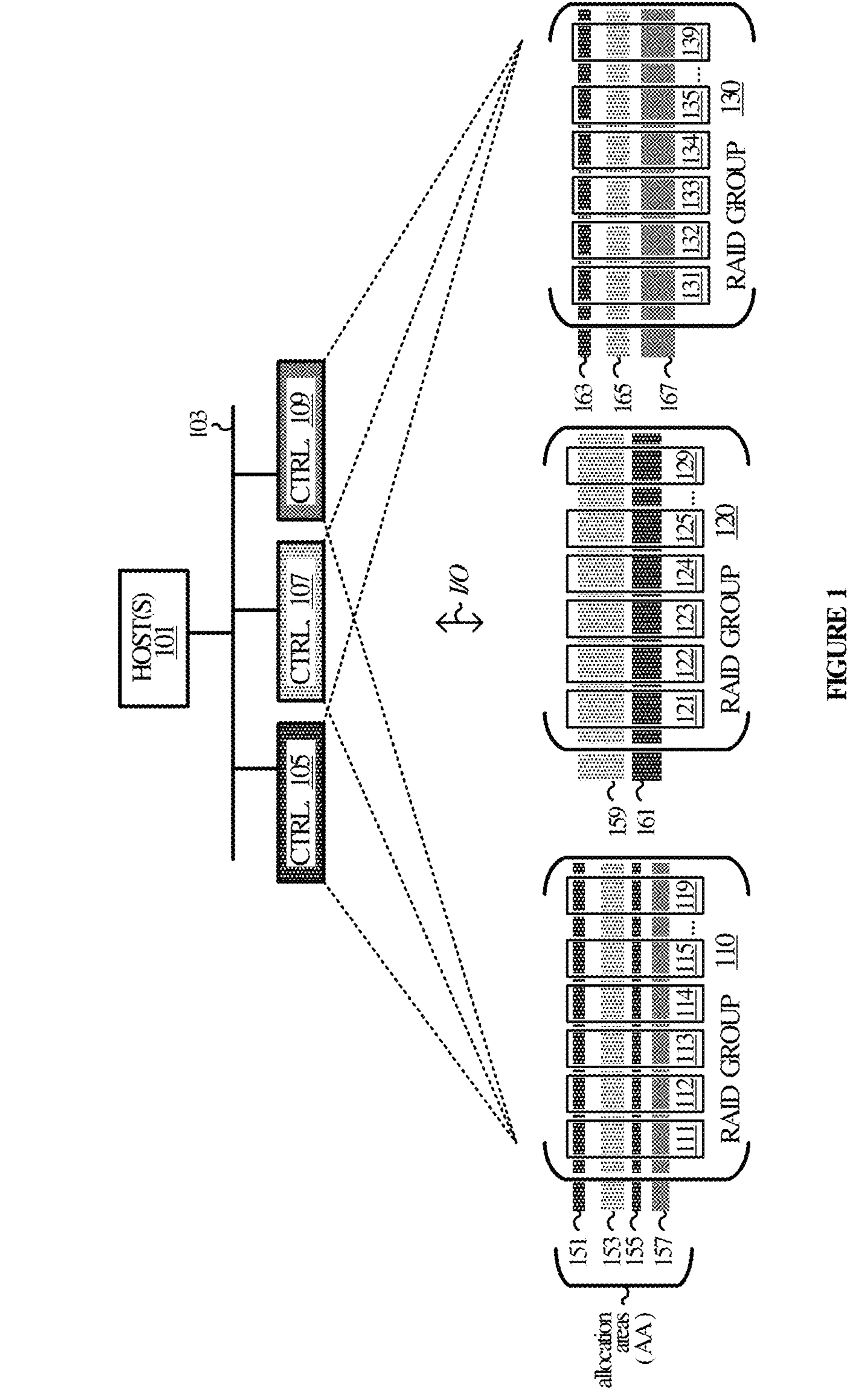
FIG. 1 illustrates an example data storage system in an implementation.

Technology is disclosed herein that mitigates the problems discussed above with respect to data recovery in existing data storage architectures by utilizing a shared-everything architecture in which each controller is capable of accessing any storage device. In a shared-everything architecture, a single pool of storage devices (referring interchangeably to the terms storage device, disk, and drive) may be utilized for an entire cluster of controllers (referring interchangeably to the terms controllers and nodes) with equal and common access to the storage devices by the controllers.

The storage devices in the data storage environment are collectively referred to as a storage aggregate. The storage aggregate is divided into multiple RAID groups (e.g., sets of drives or disks providing RAID functionality, where RAID stands for Redundant Array of Independent Disks), and each RAID group includes one or more data disks and one or more parity disks that provide redundancy with respect to each other. The arrangement of the RAID groups, and the storage devices in each RAID group, is referred to as the aggregate layout. In defining the aggregate layout, each controller in the data storage environment may be allocated a range of blocks (e.g., logical or physical address spaces) on each storage device across all the storage devices within the same RAID group (the blocks across all the storage devices being referred to as a stripe). This allows each controller to write in parallel to the same set of storage devices without corrupting each other's data.

While consuming storage from such an aggregate, any of the nodes can undergo various configuration operations resulting into updates to shared metadata corresponding to the configuration layout of the aggregate. For example, such operations may include drive failure, drive addition, or drive unavailability, such as due to a firmware update or I/O timeouts. Due to the single pool of storage being accessible to all the nodes, an update to the shared metadata needs to be reflected across all the nodes so that each controller is aware of the new layout of the aggregate while still continuing to serve the data to the clients.

A solution to this problem may need to meet requirements such as idempotence, protection from multiple nodes attempting to update the layout simultaneously, the ability to reconcile updates from multiple nodes, decentralized to allow each node to operate independently, scalability, robustness based on network or connectivity loss, ability to dynamically and automatically refresh the layout, ability to withstand IOs being served and received, ability to withstand and recover from failure scenarios.

In various embodiments, locking operations are performed to prevent access to layout metadata while a controller adds, removes, and/or replaces a storage device in a data storage environment. The layout metadata is updated by the controller that locked access thereto, and upon updating the layout metadata, other controllers can compare internal versions of the layout metadata to the updated version to ensure accurate routing of I/O requests to the storage devices of the data storage environment.

FIGS. 1, 2, 3, 4, 5, 6 and 7 below illustrate and describe additional details of such systems, devices, and methods.

FIG. 1 illustrates an example data storage system in an implementation. FIG. 1 shows system 100, which includes host(s) 101, controllers 105, 107, and 109, and RAID groups 110, 120, and 130. RAID groups 110, 120, and 130 may each include a plurality of storage devices, including data disks and parity disks. In various embodiments, controllers 105, 107, and 109 may be configured to perform metadata management processes, such as process 200 of FIG. 2.

System 100 is representative of a data storage system operating in a data storage environment. System 100 includes multiple controllers and multiple storage devices (e.g., drives) arranged in a shared-everything architecture such that each of the controllers is capable of accessing any of the storage devices. In particular, controllers 105, 107, and 109 can perform input/output (I/O) operations (e.g., read operations, write operations) with all of the storage devices of RAID groups 110, 120, and 130.

Host(s) 101 (hereinafter referred to as host 101) is representative of one or more host servers, applications, devices, systems, or the like, capable of providing I/O operations to controllers 105, 107, and 109. Host 101 may include and may be implemented in hardware, software, and/or firmware, as well as combinations and variations thereof.

By way of example, host 101 is representative of a server running an application that interfaces with system 100 via network 103 to read from and write to the storage devices of system 100. An end user accesses host 101, or the application thereof, via a user device (e.g., a computer, a tablet, a smartphone), and provides requests to perform I/O operations via one of controllers 105, 107, or 109 to access the storage devices. In such an example, host 101 may be running a data storage administration and management application representative of data management software (e.g., NetApp ONTAP) capable of providing data management operations such as storage configuration, data protection, network setup and management, and risk and node and cluster performance monitoring, among other functions. Host 101 provides the I/O requests to controllers 105, 107, and/or 109, using an interface (e.g., a command line interface (CLI)) to the application over an application programming interface (API) (e.g., a RESTful API).

Controllers 105, 107, and 109 are representative of control devices or systems that each include one or more processing devices capable of controlling, managing, and accessing each of the storage devices of system 100. Examples of the processing devices may include one or more central processing units (CPUs), general purpose processors, Application Specific Integrated Circuits (ASICs), microcontroller units (MCUs), digital signal processors (DSPs), field-programmable gate arrays (FPGAs), and the like. In some examples, controller 105 may represent two or more controllers coupled as high availability (HA) pairs for at least fault tolerance and back-up purposes.

In various examples, controllers 105, 107, and 109 are configured to run an instance of the data storage management application also running on host 101 to perform the I/O operations received from host 101. As such, the controllers interface with host 101 via the application in accordance with a storage network and access protocol, such as Non-Volatile Memory Express (NVMe). Other protocols such as Network File System (NFS), Server Message Block protocol (SMB), Internet Small Computer System Interface (iSCSI), Fiber Channel (FC), Fiber Channel over Ethernet (FCOE), and the like may be contemplated. Controllers 105, 107, and 109 may further interface with the storage devices of RAID groups 110, 120, and 130 over one of the network protocols at which the controllers perform the I/O operations.

RAID groups 110, 120, and 130 are each representative of a group or array of storage devices that provide redundancy with respect to one another. Examples of the storage devices include flash disks and/or capacity drives, such as hard-disk drives (HDDs) and solid state drives (SSDs), as well as combinations and variations thereof. As illustrated in system 100, RAID group 110 includes data disks 111, 112, 113, 114, and 115, and parity disk 119, RAID group 120 includes data disks 121, 122, 123, 124, and 125, and parity disk 129, and RAID group 130 includes data disks 131, 132, 133, 134, and 135, and parity disk 139 (all collectively referred to as disks or drives). In some embodiments, each RAID group may include additional or fewer data disks and/or parity disks. Additionally, system 100 may include additional RAID groups that can be accessed by each of controllers 105, 107, and 109.

In various embodiments, each controller of system 100 interfaces with RAID groups 110, 120, and 130, as well as each data and parity disk of the RAID groups, based on the shared-everything layout. In other words, controllers 105, 107, and 109 each have access to some or all of the RAID groups and data and parity disks thereof and provide I/O requests to the data and parity disks to write to or read from the disks of the RAID groups.

In various embodiments, the disks in each RAID group are divided into allocation areas, such that each controller is allocated a specific location from which to read data and to which to write data. In particular, each allocation area corresponds to one of controllers 105, 107, and 109. For example, RAID group 110 includes allocation areas 151, 153, 155, and 157, which include portions of storage within each of data disks 111, 112, 113, 114, and 115 of RAID group 110. Allocation areas 151 and 155 are associated with controller 105, allocation area 153 are associated with controller 107, and allocation area 157 are associated with controller 109. RAID group 120 includes allocation areas 159 and 161. Allocation area 159 is associated with controller 107, and allocation area 161 is associated with controller 105. RAID group 130 includes allocation areas 163, 165, and 167. Allocation area 163 is associated with controller 105, allocation area 165 is associated with controller 107, and allocation area 167 is associated with controller 109. Additional or fewer allocation areas may be included in each RAID group, as well as combinations and variations thereof with respect to each controller of system 100.

Figure 2:
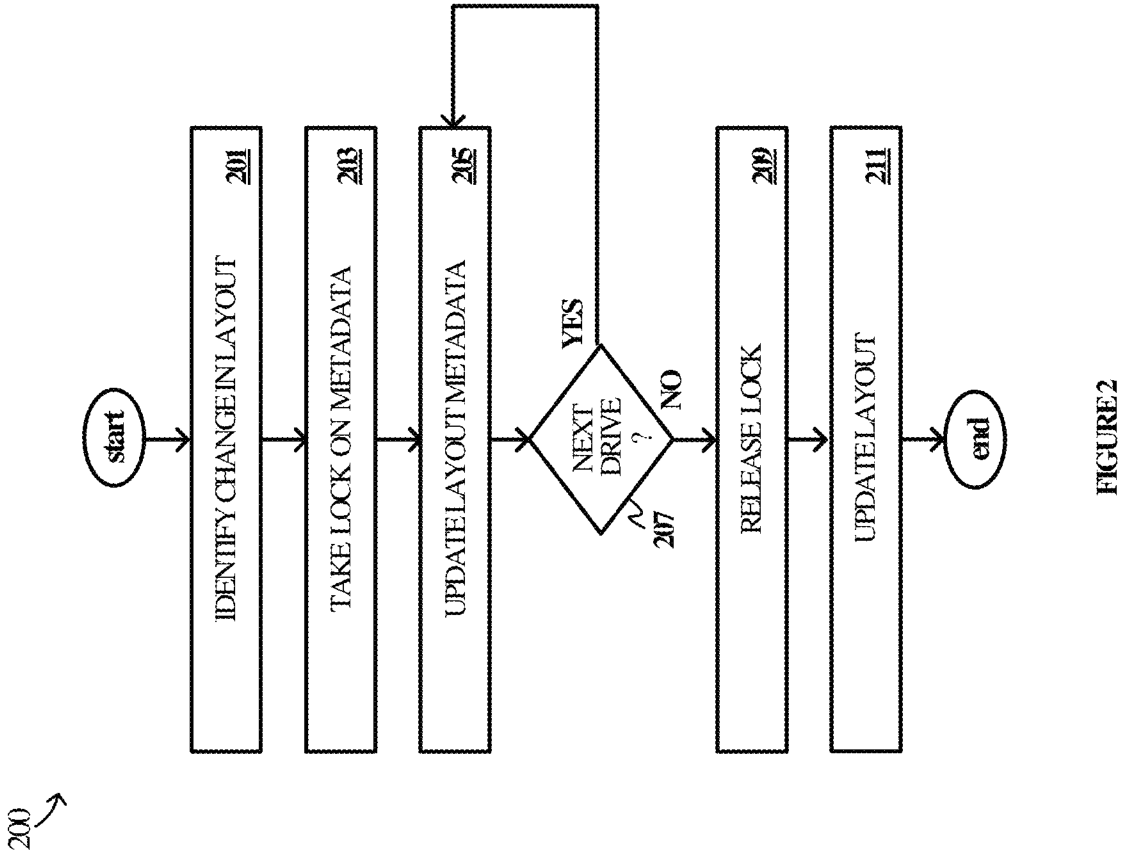
FIG. 2 illustrates a method for managing access to storage devices of a data storage system in an implementation.

In operation, each controller performs I/O operations at one or more respective allocation areas and RAID groups. For example, when performing a write operation, controller 105 writes data to allocation area 151 across each data disk of RAID group 110. Accordingly, each controller of system 100 has access to read from and write to each data disk of each RAID group at a respective allocation area. Each controller may further be able to write and read metadata from the data disks to lock or unlock layout metadata corresponding to the layout of the storage devices, the RAID groups, and the sequence thereof in each RAID group. FIG. 2 shows process 200, which describes a method for locking and unlocking the layout metadata based on changes to the layout of the storage devices and/or RAID groups of system 100.

FIG. 2 illustrates a method for managing access to storage devices of a data storage system in an implementation. Process 200 may be employed by a computing device, such as a controller of system 100 (e.g., one of controllers 105, 107, and 109), an example of which is provided by computing system 801 of FIG. 8. Accordingly, process 200 may be implemented in hardware, software, and/or firmware, and may be implemented in program instructions executable by one or more processors of the computing device. The program instructions direct the computing device to operate in accordance with the steps of process 200, which reference elements of FIG. 1.

In operation 201, one of the controllers of system 100 (e.g., controller 105) identifies a change in the layout of the storage aggregate of system 100. For example, controller 105 identifies that a storage device has failed, is removed, or is otherwise unavailable. In another example, the controller identifies that a storage device is newly added to system 100 (e.g., physically coupled to an enclosure holding at least some of the storage devices, logically coupled to a RAID group in system 100).

Based on the change in layout, in operation 203, the controller takes a lock on metadata shared among the controllers and stored in each of the storage devices in system 100. The metadata corresponds to the layout of the storage devices and the RAID groups of system 100, and as such, is referred to as layout metadata. Taking a lock of the layout metadata may entail the controller updating a bit (e.g., a lock indicator) of the layout metadata to indicate that the layout metadata is locked for editing by the controller and is unavailable for the other controllers in system 100.

In some examples, taking the lock of the layout metadata may result in I/O operations corresponding to a particular disk to be frozen or queued for later execution. This may be beneficial to avoid drops in I/O operations based on a disk failing or being removed from system 100 temporarily or permanently.

In various examples, the controller selected to take the lock on the layout metadata is determined on a first-come, first-served basis. However, when multiple controllers compete to take the lock (i.e., attempt to lock the metadata at the same time), the selection of the controller able to take the lock is based on applying an algorithm (e.g., Dijkstra's Algorithm) to determine which controller is optimal (e.g., with respect to efficiency, processing capacity, etc.) to take the lock such that only one controller is able to take the lock at a given time. Other algorithms may be contemplated.

Upon successfully taking the lock on the layout metadata, in operation 205, the controller updates instances of the layout metadata stored on each of the disks of system 100. This includes changing values in the layout metadata corresponding to the layout of the storage aggregate following the change in the layout. More specifically, the controller changes one or more values to remove a disk from the layout, update a sequence of the disks in a particular RAID group, and/or the like, based on the change to the layout. The controller proceeds to update the layout metadata for each disk, sequentially or in parallel, until all of the layout metadata is up-to-date as in operation 207.

In operation 209, the controller releases the lock on the layout metadata. This entails reverting the bit of the layout metadata to indicate that the layout metadata is available for use by the other controllers. Additionally, in some examples, this allows I/O operations to continue with respect to one or more of the disks that may have been indicated as locked.

Prior to continuing performance of I/O operations after a change in the layout metadata, all of the controllers first read internal (e.g., in-memory) versions of the layout metadata and compare the internal version to the layout metadata to determine inconsistencies between the sets of metadata. Based on determining a difference between an internally-stored layout and the current layout indicated in the layout metadata, the controllers, in operation 211, update the internal layout metadata to reflect the change to the layout as indicated in the layout metadata stored on each of the disks. The controllers then perform I/O operations based on the latest layout.

Advantageously, the controllers of system 100 may be able to lock and unlock access to disks of different RAID groups based on identified failures or upgrades of the disks without manual intervention. The other controllers may identify a lock and queue I/O operations corresponding to the locked disk(s) until release of the lock without presenting errors to host 101.

Figure 3:
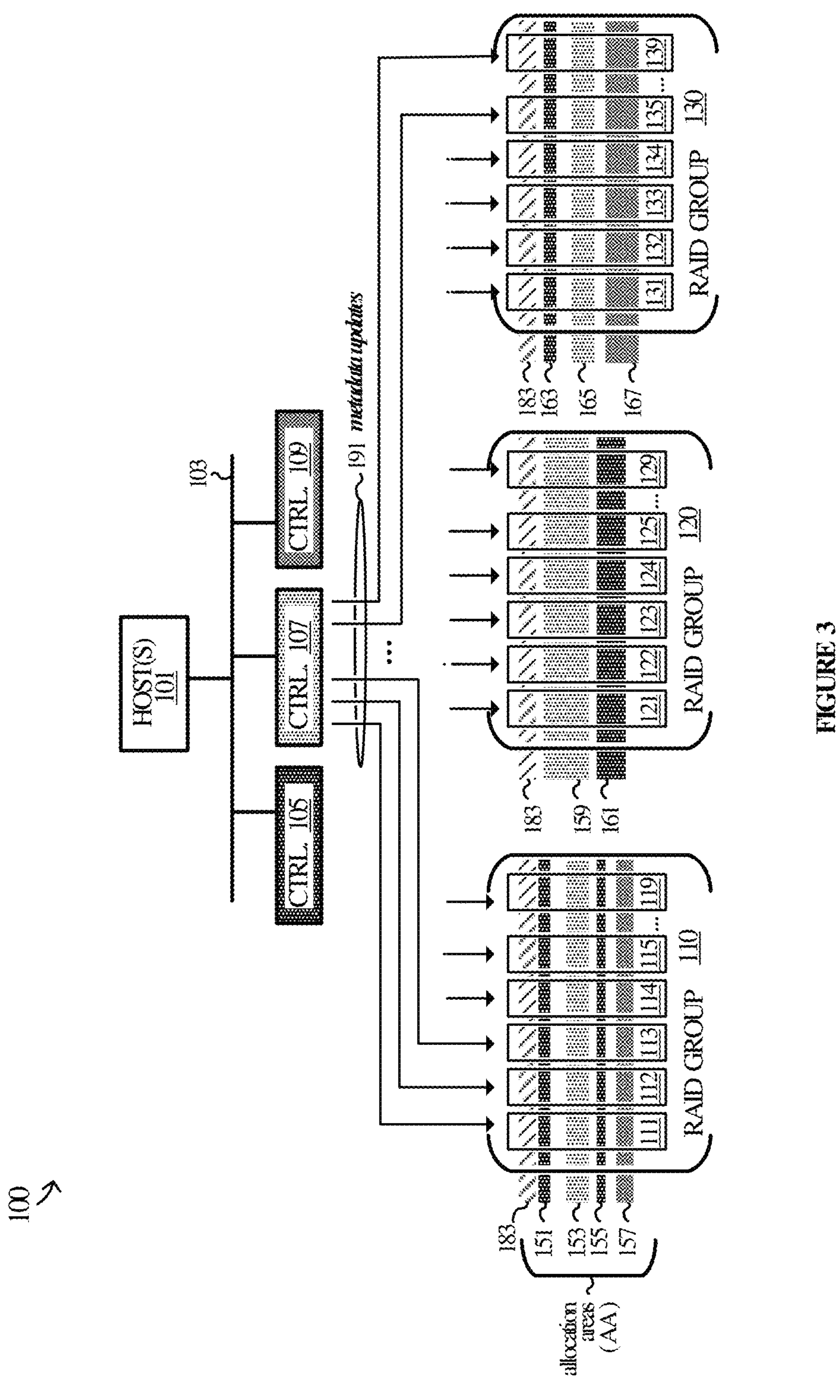
FIG. 3 illustrates an example operating environment in an implementation.

FIG. 3 illustrates an example operating environment in an implementation. FIG. 3 includes and references elements of FIG. 1, such as system 100 and elements thereof. Elements of FIG. 3 may be configured to perform metadata and parity bit management processes, such as process 200 of FIG. 2.

Referring first to FIG. 3, FIG. 3 shows a first operating environment in which elements of system 100 may be configured to make metadata updates 191 to update metadata sub-section 183 of each disk of RAID groups 110, 120, and 130 to update a layout and corresponding layout metadata of the disks and corresponding RAID groups.

By way of example, controller 107 may identify that a data disk of one of the RAID groups of system 100 has failed. Accordingly, controller 107 takes a lock on layout metadata corresponding to the layout (e.g., groupings of disks in each RAID group, sequence of disks in each RAID group) of the data disks of system 100 stored in metadata sub-section 183 on each disk.

Taking the lock on the metadata may include first updating the layout metadata stored in metadata sub-section 183 to indicate that the layout metadata, and consequently the layout, is unavailable and locked for editing by controller 107. In particular, metadata sub-section 183 includes a lock indicator, the layout metadata, and other disk metadata. The lock indicator may include a value indicative of whether the layout metadata is available or unavailable for editing based on the value. The layout metadata corresponds to a layout of the disks and RAID groups of system 100. When taking the lock on the metadata, controller 107 changes the value of the lock indicator from available to unavailable. While the lock indicator corresponds to an unavailability of the layout metadata, controllers 105 and 109 may be "locked out" from updating the configuration layout.

Upon locking the metadata, controller 107 outputs metadata updates 191 to all of the disks in system 100 to update the layout metadata stored on each of the disks at metadata sub-section 183. Metadata updates 191 include an indication of an unavailable status (e.g., a locked status) of the layout metadata. Metadata updates 191 may further include an indication that a particular data disk among one of RAID groups 110, 120, and 130 has failed (e.g., a change in the layout), as well as indications of a current layout based on the failure of a disk, for example.

Subsequently, after controller 107 outputs metadata updates 191, controller 107 releases the lock (e.g., updates the metadata to indicate an availability of the data disks). Then, one or more of controllers 105 and 109 identify changes in the layout metadata based on metadata updates 191 and evaluate metadata stored in-memory of controllers 105 and 109 to determine that a refresh of the in-memory metadata is required. The controllers may then update the in-memory metadata and queue any I/O operations to the failed data disk until receiving a further metadata update.

Figure 4:
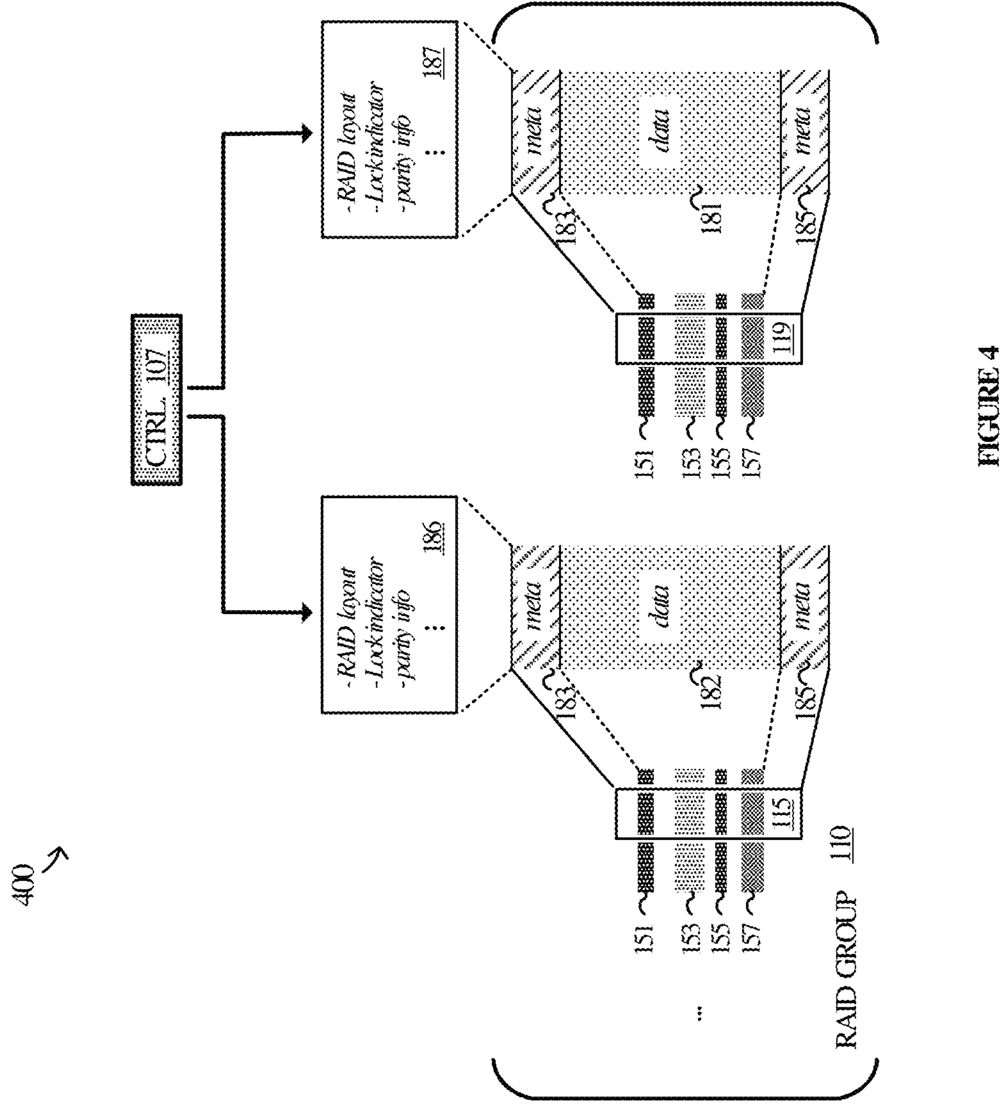
FIG. 4 illustrates an example operating environment in an implementation.

FIG. 4 illustrates an aspect of a data disk and a parity disk of RAID group 110 of system 100. FIG. 4 shows aspect 400, which includes and references elements of system 100 of FIG. 1, such as controller 107, and data disk 115 and parity disk 119 of RAID group 110.

Data disk 115 is representative of one of the storage devices of RAID group 110 that stores user data identified in I/O requests provided to controller 107, among other controllers. Parity disk 119 is representative of a storage device that stores parity data computed based on user data stored in other storage devices, such as data disk 115, in RAID group 110 to provide redundancy with respect to the data disks in RAID group 110. Both data disk 115 and parity disk 119 may include sections of different types of data, such as metadata sub-section 183, user data sub-section 182, parity data sub-section 181 and metadata sub-section 185. While only data disk 115 and parity disk 119 of RAID group 110 are shown in aspect 400 to demonstrate representations of data and metadata stored thereon, all other disks of system 100 also store data and metadata similar to these disks and are not shown for the sake of brevity and simplicity. More specifically, each data disk includes one or more sections (like user data sub-section 182) dedicated to storing user data written to the disk based on I/O operations performed by the controllers, and each disk also includes one or more sections (like metadata sub-sections 183 and 185) dedicated to storing metadata, such as an indication of the lock, the RAID layout, and other disk information.

Metadata sub-section 185 includes various metadata related to the controllers of system 100. An example of this metadata includes indications that indicate which allocation areas are owned by which controller. Such metadata may be arranged in parity metadata bitmaps, each corresponding to a controller of system 100.

Parity data sub-section 181 includes a set of parity bits that correspond to user data stored in the data disks of RAID group 110, while user data sub-section 182 includes user data written to data disk 115, among other data disks, in the performance of I/O operations by the controllers of system 100.

Metadata sub-section 183 includes metadata 187 related to the RAID group layout, a lock indicator associated with the RAID group layout, and parity information, among other information. Metadata sub-section 183 may be read from and written to by controller 107, among other controllers. For example, controller 107 may update information in metadata sub-section 183 corresponding to a status (e.g., locked/unlocked, available/unavailable) of layout metadata stored on data disk 115 and parity disk 119, among other disks. More specifically, controller 107 may update metadata 187 to indicate that the RAID group layout has changed based on a data disk of RAID group 110 failing. After updating metadata 187 in data disk 115 and parity disk 119, controller 107 may provide an indication to another controller of system 100 (e.g., controller 105, controller 109) to obtain the updated metadata 187 to prevent the other controller(s) from attempting to access the failed data disk. Alternatively, after the update to metadata 187, another controller may read metadata 187 prior to receiving an indication from controller 107.

Based on metadata 187, the other controllers refresh internally stored metadata corresponding to the configuration layout to synchronize with metadata 187. Then, the other controllers may queue any I/O operations corresponding to the failed data disk, or respective allocation areas thereof, once metadata 187 indicates that the failed data disk is available.

Figure 5:
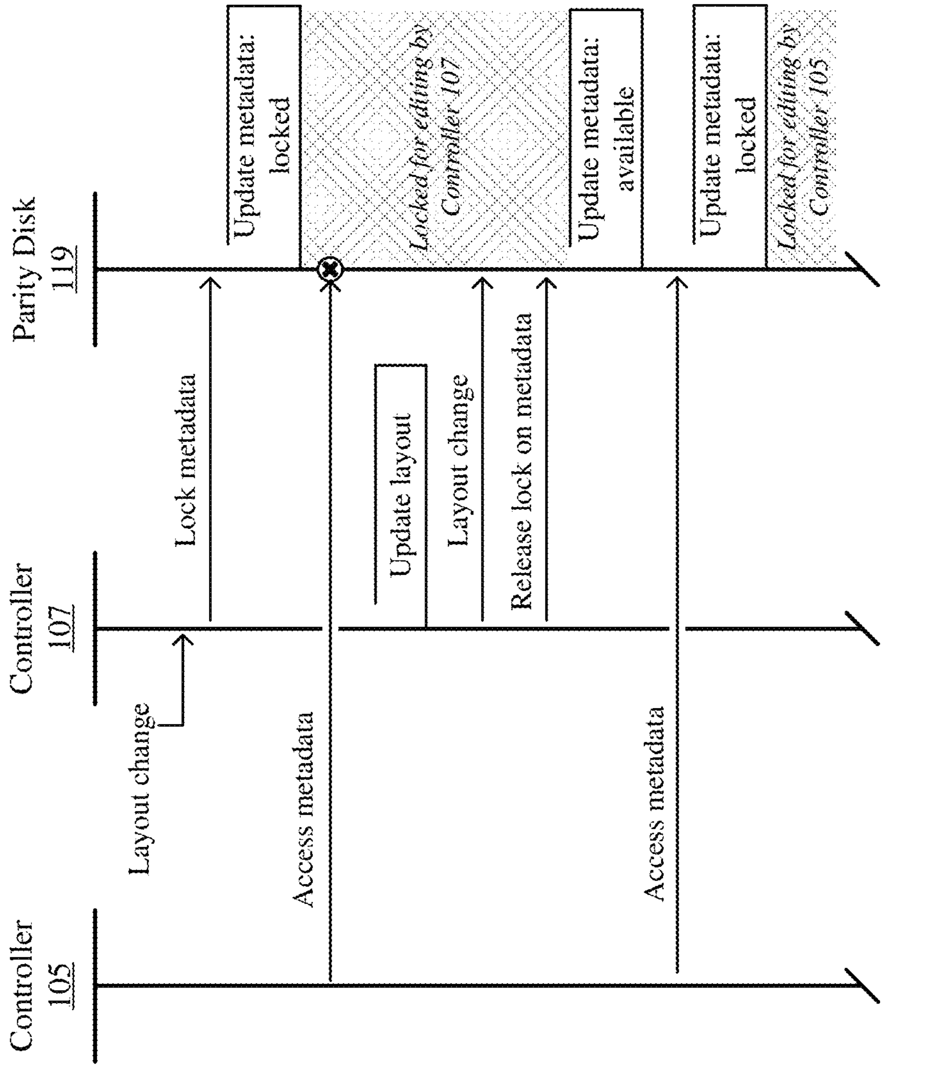
FIG. 5 illustrates an operational sequence in an implementation.

FIG. 5 illustrates operational sequence 500 demonstrative of an example sequence of events performable by elements of system 100 in an implementation. In particular, operational sequence 500 includes various steps performed by controller 105, controller 107, and parity disk 119 of system 100.

To begin operational sequence 500, controller 107 identifies a change in the layout of the storage devices of system 100. For example, a data disk of RAID group 110 may have temporarily failed, and thus, is unavailable for a duration. In response to determining the change in the layout, controller 107 takes a lock on layout metadata stored on each of the disks of system 100, including parity disk 119. While only parity disk 119 is shown and described in operational sequence 500, it may be appreciated that controller 107 may take a lock on metadata stored in other disks as well, but parity disk 119 is shown as an example for the sake of brevity.

Upon receiving a request to lock the layout metadata, parity disk 119 identifies the current state of the layout metadata with respect to a lock indication. Based on determining that the layout metadata is not currently locked by another controller, parity disk 119 indicates the layout metadata as locked for editing by controller 107. When the layout metadata is locked for editing by controller 107, other controllers might not be able to edit layout metadata. By way of example, controller 105 attempts to access the layout metadata while the layout metadata is locked by controller 107. As a result, parity disk 119 may provide a notification of the lock to controller 105, or alternatively, controller 105 may read the lock indication at parity disk 119 and identify the metadata is locked.

After controller 107 takes the lock on the layout metadata, controller 107 updates the layout metadata to reflect the change in the layout of the storage devices. Subsequently, controller 107 releases the lock on the layout metadata, or in other words, updates the lock indication of the layout metadata to available. Controller 107 releases the lock on the layout metadata such that each disk indicates an availability of the layout metadata with respect to editing. Thus, controller 105, in a subsequent attempt to edit the layout metadata, can access the layout metadata at parity disk 119 and take a lock on the layout metadata to make updates to the layout of the storage devices.

Figure 6:
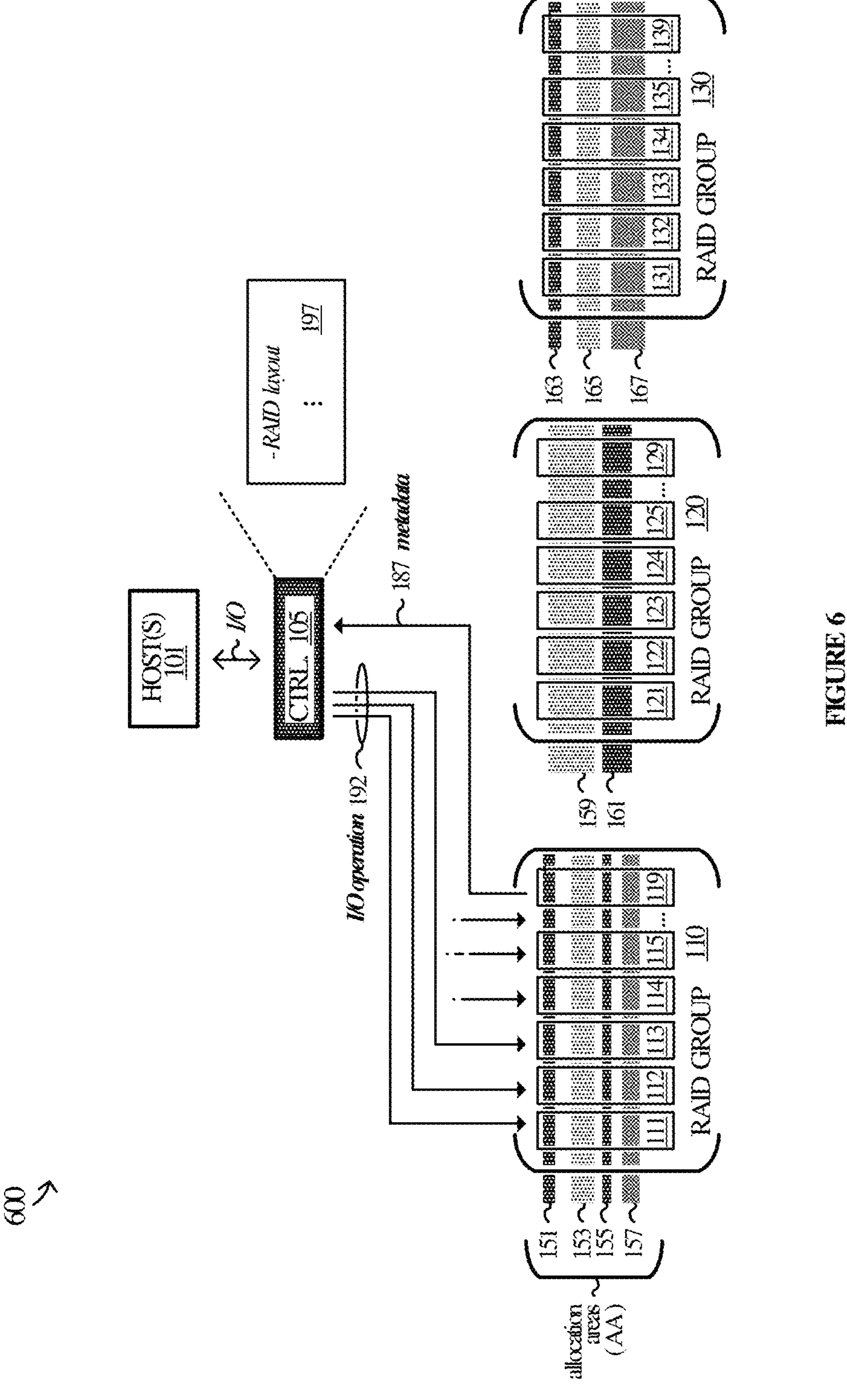
FIG. 6 illustrates an example operating environment in an implementation.

FIG. 6 illustrates an operating environment in which controller 105 of system 100 performs internal layout refresh operations following an update to layout metadata. FIG. 6 shows operating environment 600, which includes and references elements of system 100 of FIG. 1, such as host 101, controller 105, and RAID groups 110, 120, and 130.

In operating environment 600, controller 105 performs I/O operation 192 (e.g., a read operation, a write operation) following an update to metadata 187 stored on parity drive 119 (as well as other drives) of RAID group 110 as described above with respect to FIGS. 3 and 4. Metadata 187 includes information about the layout of the storage aggregate, such as the RAID groups of system 100, the drives in each RAID group, and a sequencing of the drives in each RAID group.

Controller 105 also internally stores metadata indicative of the layout of the storage aggregate, metadata 197. However, metadata 197 might not always be consistent with respect to metadata 187 because other controllers might make updates to metadata 187 due to changes in the aggregate layout. As such, when controller 105 is directed to perform I/O operation 192, controller 105 may first read metadata 187 and compare metadata 187 to metadata 197 to determine whether metadata 197 and metadata 187 include the same information. Upon determining that metadata 197 is inconsistent with metadata 187, controller 105 updates metadata 197 to reflect the latest layout as indicated in metadata 187. Then, controller 105 performs I/O operation 192 to read from and/or write to disks of RAID group 110 in accordance with the latest metadata now stored both locally and on each of the drives.

Figure 7:
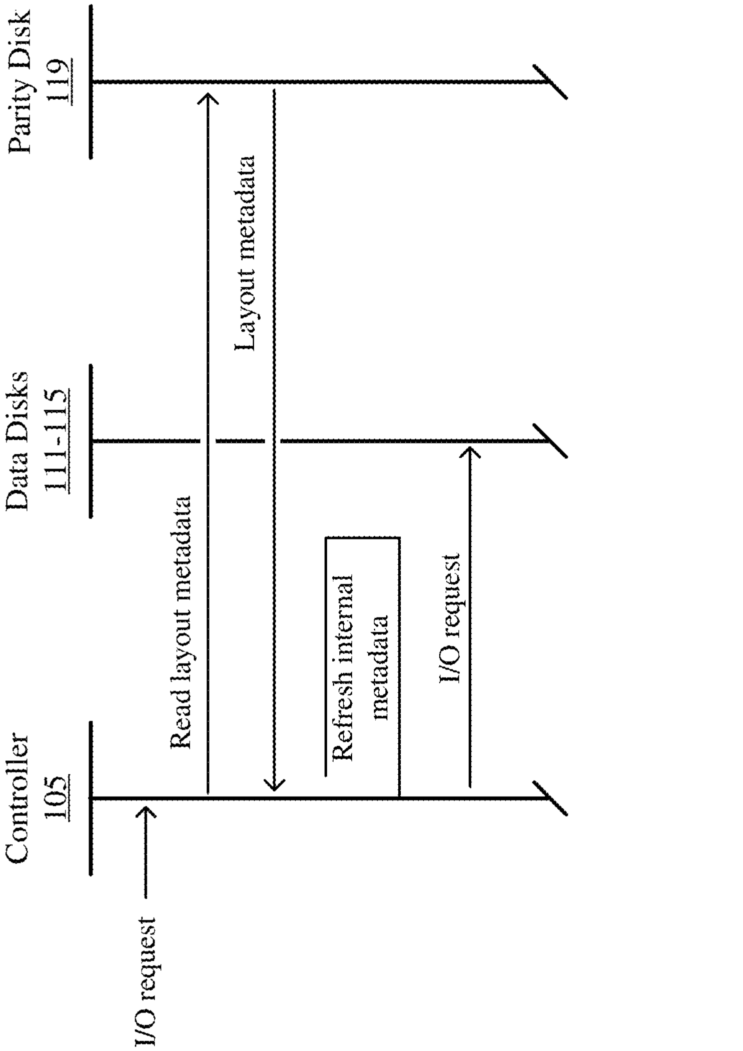
FIG. 7 illustrates an example operating sequence in an implementation.

FIG. 7 illustrates operational sequence 700 demonstrative of an example sequence of events performable by elements of system 100, which includes and references elements of system 100 and operating environment 600. In particular, operational sequence 700 includes various steps performed by controller 105, data disks 111-115, and parity disk 119 of system 100.

To begin operational sequence 700, controller 105 receives an I/O request from host 101. The I/O request includes I/O operation 192 and a set of a disks at which to perform the operation, such as data disks 111, 112, 113, 114, and 115 of RAID group 110. In response to receiving the I/O request, controller 105 reads metadata 187 from parity disk 119 of RAID group 110 to ensure internally-stored layout metadata (metadata 197) is up-to-date, or in other words, reflects the current layout of the data disks of RAID group 110.

Based on a previous change to metadata 187, controller 105 determines that metadata 197 does not match metadata 187, and thus, is out-of-date. As a result, controller 105 refreshes metadata 197 to match metadata 187. Then, controller 105 performs I/O operation 192 at data disks 111-115 based on metadata 197.

It may be appreciated that developing strategies to mitigate the impact of data loss and disruption of requests to access data and corresponding storage devices due to storage device management processes has become important for enterprises and end users. Failures of storage devices, updates or upgrades to storage devices, and/or failures of controllers with which to manage such storage devices may occur and interrupt access to data.

To mitigate the downtime and disruption introduced when performing storage device upgrades, rebuilds, replacements, and the like, enterprises may utilize various systems, methods, and devices as described herein to manage data management systems, clusters thereof, nodes thereof, and RAID groups including various storage devices (e.g., disks), as well as data and metadata thereof.

The disclosure describes systems, methods, and devices for managing storage devices and the layout thereof in a data storage environment, managing access to the storage devices, and the like in shared-everything data storage system architectures, as well as for at least: 1) locking metadata on storage devices of a cluster of a data storage system to perform a dynamic aggregate layout refresh; 2) updating the metadata to ensure accurate routing of I/O operations; and 3) refreshing internally-stored metadata based on the updated metadata without intervention from other controllers.

Various embodiments of the present technology provide for a wide range of technical effects, advantages, and/or improvements to computing systems and components. For example, various embodiments may include one or more of the following technical effects, advantages, and/or improvements: 1) management of access to storage devices; 2) non-disruptive access to storage devices; 3) management of storage devices and RAID groups of storage devices; 4) scalable controllers and storage devices in a distributed shared-everything architecture; 5) scalable RAID group layouts; and 6) ability to protect against and reconcile updates to storage devices, and metadata thereof, from multiple controllers.

Figure 8:
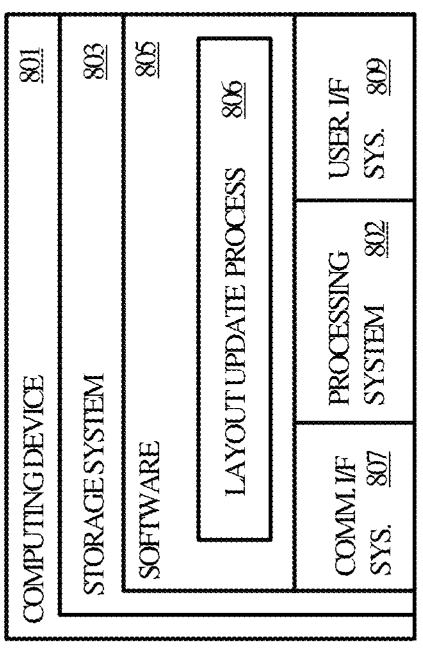
FIG. 8 illustrates a computing system suitable for implementing the various systems, operational environments, architectures, environments, methods, processes, scenarios, sequences, and frameworks discussed below with respect to the other Figures.

FIG. 8 illustrates computing system 801, which is representative of any system or collection of systems in which the various applications, processes, services, and scenarios disclosed herein may be implemented. Examples of computing system 801 include, but are not limited to server computers, web servers, cloud computing platforms, and data center equipment, as well as any other type of physical or virtual server machine, container, and any variation or combination thereof. (In some examples, computing system 801 may also be representative of desktop and laptop computers, tablet computers, smartphones, and the like.)

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809.

Processing system 802 loads and executes software 805 from storage system 803. Software 805 includes and implements layout update process 806, which is representative of the processes discussed with respect to the preceding Figures. When executed by processing system 802, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may include a microprocessor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, microcontroller units, graphical processing units, application specific processors, integrated circuits, application specific integrated circuits, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. Storage system 803 may be implemented as a single storage device but may also be implemented across multiple storage devices or sub-systems co-located or distributed relative to each other. Storage system 803 may comprise additional elements, such as a controller capable of communicating with processing system 802 or possibly other systems.

Software 805 (including layout update process 806) may be implemented in program instructions and among other functions may, when executed by processing system 802, direct processing system 802 to operate as described with respect to the various operational scenarios, sequences, and processes illustrated herein. For example, software 805 may include program instructions for implementing data, data storage, controller, drive, disk, and data storage management processes and procedures as described herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," "in an implementation," "in some implementations," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method comprising:

by a controller in a data storage environment comprising multiple controllers and a storage aggregate that includes multiple drives, wherein each of the controllers is capable of communicating with each of the drives in the storage aggregate:

identifying a change to a layout of the drives of the storage aggregate; and in response to identifying the change, for each drive of the multiple drives:

taking a lock on an instance of layout metadata stored on the drive;

updating the instance of the layout metadata to reflect the change to the layout in the instance of the layout metadata; and releasing the lock on the instance of the layout metadata.

2. The method of claim 1, wherein taking the lock on the instance of layout metadata comprises, for each drive, editing a lock indicator stored on the drive to reflect that the instance of the layout metadata is locked for editing by the controller and is unavailable to any others of the multiple controllers.

3. The method of claim 2, wherein the storage aggregate comprises redundancy groups each comprising a subset of the drives that provides redundancy with respect to each other, wherein the layout comprises an association between subsets of the drives and the redundancy groups of the storage aggregate, a sequence of drives within a corresponding subset of the drives, and addresses of the drives allocated to each of the multiple controllers.

4. The method of claim 3, wherein the change to the layout of the drives comprises one or more of a removal of one or more of the drives from a redundancy group of the storage aggregate, a move of one or more of the drives from one redundancy group to another redundancy group, and a change in sequence of the drives in a redundancy group.

5. The method of claim 4, wherein releasing the lock on the instance of the layout metadata comprises, for each drive, editing the lock indicator on the drive to reflect that the instance of the layout metadata is available to the multiple controllers.

6. The method of claim 5, further comprising, by the controller, updating an in-memory version of the layout metadata stored in a memory of the controller based on the change to the layout.

7. The method of claim 6, wherein the redundancy groups comprise Redundant Array of Independent Disks (RAID) groups.

8. A computing apparatus comprising:

one or more computer-readable storage media; and program instructions stored on the one or more computer-readable storage media executable by a processing device that, based on being read and executed by the processing device, direct the processing device to:

identify a change to a layout of drives of a storage aggregate in a data storage environment, wherein the data storage environment comprises the storage aggregate that includes the drives, and multiple controllers capable of communicating with each of the drives in the storage aggregate; and in response to identifying the change, direct a controller of the multiple controllers to, iteratively for each drive of the storage aggregate:

take a lock on an instance of layout metadata stored on the drive;

update the instance of the layout metadata to reflect the change to the layout in the instance of the layout metadata; and release the lock on the instance of the layout metadata.

9. The computing apparatus of claim 8, wherein to take the lock on the instance of layout metadata, the program instructions direct the processing device to edit, iteratively for each drive, a lock indicator stored on the drive to reflect that the instance of the layout metadata is locked for editing by the controller and is unavailable to any others of the multiple controllers.

10. The computing apparatus of claim 9, wherein the storage aggregate comprises redundancy groups each comprising a subset of the drives that provides redundancy with respect to each other, wherein the layout comprises an association between subsets of the drives and the redundancy groups of the storage aggregate, a sequence of drives within a corresponding subset of the drives, and addresses of the drives allocated to each of the multiple controllers.

11. The computing apparatus of claim 10, wherein the change to the layout of the drives comprises one or more of a removal of one or more of the drives from a redundancy group of the storage aggregate, a move of one or more of the drives from one redundancy group to another redundancy group, and a change in sequence of the drives in a redundancy group.

12. The computing apparatus of claim 11, wherein to release the lock on the instance of the layout metadata, the program instructions direct the processing device to edit, iteratively for each drive, the lock indicator stored on the drive to reflect that the instance of the layout metadata is available to the multiple controllers.

13. The computing apparatus of claim 12, wherein the program instructions further direct the processing device to update an in-memory version of the layout metadata based on the change to the layout.

14. The computing apparatus of claim 13, wherein the redundancy groups comprise Redundant Array of Independent Disks (RAID) groups.

15. One or more non-transitory computer-readable storage media having stored thereon program instructions executable by one or more processors of a data storage environment, that, when executed by the one or more processors, direct the one or more processors to:

identify a change to a layout of drives of a storage aggregate of the data storage environment comprising multiple controllers capable of communicating with each of the drives of the storage aggregate;

in response to identifying the change, direct a controller of the multiple controllers to, iteratively for each drive of the storage aggregate:

take a lock on an instance of layout metadata stored on the drive;

update the instance of the layout metadata to reflect the change to the layout in the instance of the layout metadata; and release the lock on the instance of the layout metadata.

16. The one or more non-transitory computer-readable storage media of claim 15, wherein to take the lock on the instance of layout metadata, the program instructions direct the one or more processors to direct the controller to edit a lock indicator stored on the drive to reflect that the instances of the layout metadata is locked for editing by the controller and is unavailable to any others of the multiple controllers.

17. The one or more non-transitory computer-readable storage media of claim 16, wherein the storage aggregate comprises redundancy groups each comprising a subset of the drives that provides redundancy with respect to each other, wherein the layout comprises an association between subsets of the drives and the redundancy groups of the storage aggregate, a sequence of drives within a corresponding subset of the drives, and addresses of the drives allocated to each of the multiple controllers.

18. The one or more non-transitory computer-readable storage media of claim 17, wherein the change to the layout of the drives comprises one or more of a removal of one or more of the drives from a redundancy group of the storage aggregate, a move of one or more of the drives from one redundancy group to another redundancy group, and a change in sequence of the drives in a redundancy group.

19. The one or more non-transitory computer-readable storage media of claim 18, wherein to release the lock on the instance of the layout metadata, the program instructions direct the one or more processors to direct the controller to edit the lock indicator stored on the drive to reflect that the instance of the layout metadata is available to the multiple controllers.

20. The one or more non-transitory computer-readable storage media of claim 19, wherein the program instructions further direct the one or more processors to direct the controller to update an in-memory version of the layout metadata based on the change to the layout.

* * * * *